3,171,710
PROCESS FOR THE DYEING OF STEREOREGULAR POLYPROPYLENE TEXTILE MATERIALS WITH AQUEOUS DISPERSIONS CONTAINING WATER-INSOLUBLE DYESTUFFS
Alan Chapman, Christopher David Marrable, Walter Percival Mills, and Raymond Price, Manchester, England, assignors to Imperial Chemical Industries Limited, Millbank, London, England, a corporation of Great Britain
No Drawing. Filed Feb. 27, 1963, Ser. No. 261,516
Claims priority, application Great Britain, Feb. 28, 1962, 7,838/62
2 Claims. (Cl. 8—55)

This invention relates to a dyeing process for textile materials comprising polyolefine fibres especially fibres of stereoregular polypropylene.

Polyolefine fibres, being composed entirely of carbon and hydrogen, are not dyed satisfactorily from aqueous dyebaths by means of dyes which are commonly used for other fibres. The dyestuffs which have hitherto been considered to have the best affinity for polyolefine fibres are those in which a portion of the molecule is of aliphatic or cycloaliphatic character. All dyestuffs which have hitherto been employed for dyeing polyolefine fibres, however, fail to build up satisfactorily, so that dyeings of deep shade cannot be obtained. Furthermore those dyes which are known to build up even moderately well are easily removed from the fibre by treatment with dry-cleaning solvents such as perchloroethylene.

It has been proposed to mass-colour polyolefines before spinning into fibre, but even this process is at present unsatisfactory because many dyes have only low degrees of compatibility with the polymer so that homogeneous deep shades cannot be obtained.

It has been also proposed to manufacture polyolefine fibres which contain metallic compounds such as zinc and magnesium stearates, so that dyeing, particularly in deep shades may be accomplished from aqueous dyebaths by means of dyestuffs which react with the metal.

Other proposals have been made for "modifying" polyolefine textile material in order to make it more easily dyeable by including additives which have affinity for the dyestuffs and by various forms of chemical treatment.

We have now found that water-insoluble dyestuffs containing at least one fully substituted amide group (that is to say, an amide group in which the nitrogen atom is not attached to a hydrogen atom) have good affinity for polyolefine textile materials, including ordinary "unmodified" stereoregular polypropylene, and may be applied in simple manner to give dyeings of deep shade and good fastness properties.

According to the invention therefore we provide a process for the dyeing of polyolefine textile materials which comprises applying to said textile material a water-insoluble dyestuff containing at least one fully substituted amide group.

The water-insoluble dyestuffs used in the process of the invention may be of any desired series, but preferably they are of the monoazo, disazo, anthraquinone, methine, azamethine or nitrodiphenylamine series, dyestuffs of the monoazo and disazo series being of special interest. They may, however, be of other series, for example the quinphthalone, oxazine, dioxazine, azine, thiazine, triphenyl methane, tetrazaporphin, or diphenyl-methane series.

The dyestuffs, being water-insoluble are devoid of sulphonic and carboxylic acid groups and quaternary ammonium salt groups. In the water-insoluble dyestuffs, the colour-providing (chromophoric) portion of the dyestuff molecule may be attached either to the nitrogen atom of the amide group or it may be attached to or form part of the acyl radical of the amide group.

More particularly the water-insoluble dyestuffs used in the process of the invention may be of the formula $$D-(X-R)_n$$

wherein D represents the colour-providing portion of the dyestuff molecule, R represents a lower alkyl or substituted alkyl, cycloalkyl, aralkyl or aryl radical, $n$ is preferably 1, but may be 2 or 3 and X is joined to a cyclic or non-cyclic carbon atom of D and represents a group of the formula $$-\overset{R'}{\underset{|}{C}}ON-, \quad -\overset{R'}{\underset{|}{S}}O_2N-, \quad -\overset{R'}{\underset{|}{N}}CO-, \quad -\overset{R'}{\underset{|}{N}}SO_2-, \text{ or } -\overset{Z \frown N}{\underset{|}{N}} \overset{}{\underset{O}{\diagdown}}$$

in which Z represents the atoms necessary to complete a diazine or triazine ring which may carry other substituents, R' represents a lower alkyl, substituted alkyl, cycloalkyl or aralkyl radical, or in the cases when X represents a radical of the formula $$-\overset{R'}{\underset{|}{C}}ON- \text{ or } -\overset{R'}{\underset{|}{S}}O_2N-$$

then R and R' may together represent the atoms necessary to form with the amide nitrogen atom a heterocyclic ring which may contain other hetero atoms.

Preferably the (X—R) group contains not more than 8 carbon atoms.

In the foregoing paragraph the term lower alkyl radical may be exemplified by methyl, ethyl, n-propyl, n-butyl, isopropyl and tert-butyl; substituted lower alkyl radical may be exemplified by diethylaminoethyl, dipropylaminoethyl, diethylaminomethyl, chloromethyl, ethylthiomethyl, cyclohexylmethyl, β-acetoxyethyl and β-methoxyethyl; cycloalkyl radical may be exemplified by cyclohexyl; aralkyl radical may be exemplified by benzyl and β-phenylethyl; and aryl radical may be exemplified by phenyl, p-tolyl, p-chlorophenyl and α- and β-naphthyl.

As examples of diazine and triazine rings which may be completed by Z we mention 1:3-diazine and 1:3:5-triazine rings and especially such rings carrying substituents such as chlorine atoms, amino, alkylamino (e.g., methylamino), dialkylamino (e.g., diethylamino) or alkoxy (e.g., methoxy) groups.

As examples of heterocyclic rings which may together be represented by R, R' and the amide nitrogen atom, when X represents $$-\overset{R'}{\underset{|}{C}}ON- \text{ or } -\overset{R'}{\underset{|}{S}}O_2N-$$

we mention piperidine, morpholine and piperazine.

Specifically, we mention the following as examples of fully substituted amide groups of the formula —X—R which may be present in the dyestuffs used in the process of our invention:

dimethylaminocarbonyl,
diethylaminocarbonyl,
dipropylaminocarbonyl,
di-n-butylaminocarbonyl,
N-methyl-N-octylaminocarbonyl,
di-(β-methoxyethyl)aminocarbonyl,
di-(β-acetoxyethyl)aminocarbonyl,
N-methyl-N-cyclohexylaminocarbonyl,
N-ethyl-N-phenylaminocarbonyl,
N-methyl-N-β-diethylaminoethylcarbonyl,
N-methyl-N-benzylaminocarbonyl,
N-piperidylcarbonyl,
N-morpholinocarbonyl,
N-(N'-methylpiperazyl)carbonyl,
dimethylaminosulphonyl, di-n-butylaminosulphonyl,
di-n-propylaminosulphonyl,
N-methyl-N-cyclo-hexylaminosulphonyl,
N-methyl-N-phenylaminosulphonyl,
N-piperidylsulphonyl,
N-(N'-methylpiperazylsulphonyl,
N-methyl-N-acetylamino,
N-ethyl-N-acetylamino,
N-methyl-N-dodecanoylamino,
N-n-octyl-N-propionylamino,
N-methyl-N-β-chloropropionylamino,
N-cyclohexyl-N-acetylamino,
N-hexyl-N-cyclohexanoylamino,
N-phenyl-N-acetylamino,
N-benzyl-N-propionylamino,
N-methyl-N-(dipropylaminoacetyl)amino,
N-methyl-N-(chloroacetyl)amino,
N-ethyl-N(diethylaminoacetyl)amino,
N-ethyl-N-(cyclohexylacetyl)amino,
N-methyl-N(ethylthioacetyl)amino,
phthalimido,
succinimido,
N-methyl-2':4'-dichloro-s-triazin-6'-ylamino,
N-methyl-2':4'-bis(diethylamino)triazin-6'-ylamino,
N-methyl-4':6'-dichloropyrimid-2'-ylamino,
N-methyl-N-methylsulphonylamino.

Of especial interest in the process of the invention are those dystuffs of the aforesaid formula wherein
(1) X represents

and R' and R represents alkyl radicals.
(2) X represents

and R' represents an alkyl radical.

Such dyes have quite exceptional building-up properties on unmodified polypropylene textile materials, giving very deep shades of high fastness properties.

The dyestuffs used in the process of our invention may be obtained by methods known in the art for the production of amides, for example by interacting appropriate amines and acid chlorides. Alternatively the dyestuffs may be obtained from dyestuff intermediates containing fully substituted amide groups. For example azo dyestuffs suitable for use in the process of our invention may be obtained by the use of diazo and/or coupling components which contain fully substituted amide groups.

The water-insoluble dyestuff containing fully substituted amide groups may be applied to the prolyolefine textile material from a solution in an organic solvent, but it is preferred to apply the water-insoluble dyestuff from a dye liquor comprising an aqueous dispersion of the dyestuff.

In the preparation of such dye liquors it is advantageous to employ dispersing agents, which may be of the anionic type, for example sulphonated naphthalene-formaldehyde condensation products, the cationic type, for example cetyltrimethylammonium bromide, or the non-ionic type, for example the condensation product of ethylene oxide with a fatty alcohol. In some cases, notably where the dyes contain dialkyl amino groups cleaner and brighter dyeings may be produced by dyeing from a dyebath which contains a non-ionic dispersing agent and which may be alkaline.

The process of the invention is preferably carried out by immersing the polyolefine textile material in a dyebath comprising an aqueous dispersion of the dyestuff and heating the dyebath to between 65° and 100° C. at atmospheric pressure, or to between 100° and 125° C. under superatmospheric pressure. Dyeing is usually complete in about 15 minutes to 1 hour and the textile material may then be removed from the dyebath, rinsed, treated in a solution of soap or synthetic detergent and dried.

It is known to dye textile materials comprising polyolefine fibres with certain water-insoluble dyestuffs of the azo series containing amide groups. In all the amide-containing dyestuffs hitherto used for this purpose the nitrogen atom of the amide group is attached to at least one hydrogen atom. Compared with such dyestuffs, the dyestuffs used in the process of our invention have greater affinity and superior build-up properties on stereoregular polypropylene fibres and the dyeings obtained are of much better fastness to the action of solvents such as perchloroethylene which are used in dry cleaning.

The invention is illustrated but not limited by the following examples in which the parts are by weight.

*Example 1*

1 part of the dyestuff obtained by coupling diazotised 4-(N:N-dimethylaminocarbonyl)aniline with p-(t-butyl)-phenol is milled with 20 parts of water and 1 part of a sulphonated naphthaleneformaldehyde condensation product and the dispersion so obtained is added to 4000 parts of water containing 4 parts of the sulphonated naphthalene formaldehyde condensate. 100 parts of polypropylene textile material is immersed in the dyebath so obtained and the temperature is raised to 100° C. Dyeing is carried out for 90 minutes at this temperature. The dyed fibre is then treated for 15 minutes in a warm aqueous solution of a synthetic detergent. The polypropylene fibre is dyed a bright reddish yellow shade of very good fastness to light, to washing and to dry cleaning with solvents such as perchloroethylene.

In place of the sulphonated naphthalene-formaldehyde condensation product used as dispersing agent there may be used other anionic dispersing agents, or cetyltrimethylammonium bromide or other cationic dispersing agents. The best results are obtained by using non-ionic dispersing agents of which the condensate of ethylene oxide (e.g., 17 moles) with cetyl alcohol is exemplificatory. When a non-ionic dispersing agent is used, the dyebath may, if desired be made alkaline.

When the dyestuff in Example 1 is replaced by the dyestuffs listed in column 2 of the following table, dyeings of the shade in column 3 are obtained. These dyestuffs all have good building-up properties and good fastness to washing and to dry cleaning with solvents such as perchloroethylene.

| Example | Dyestuff | Shade on polypropylene |
|---|---|---|
| 2 | 2-hydroxy-4'-dimethylaminocarbonyl-5-methylazobenzene. | Yellow. |
| 3 | 2-hydroxy-2'-dimethylaminocarbonyl-5-tert. butylazobenzene. | Do. |
| 4 | 2-hydroxy-4'-diethylaminocarbonyl-5-tert.butylazobenzene. | Do. |
| 5 | 2-hydroxy-4'-diethylaminocarbonyl-5-methylazobenzene. | Do. |
| 6 | 2-hydroxy-4'-dimethylaminocarbonyl-5-cyclohexylazobenzene. | Do. |
| 7 | 2-hydroxy-4'-di-n-propylaminocarbonyl-5-methylazobenzene. | Do. |
| 8 | 2-hydroxy-4'-di-n-propylaminocarbonyl-o-tert. butylazaobenzene. | Do. |
| 9 | 2-hydroxy-4'-diisopropylaminocarbonyl-5-methylazobenzene. | Do. |
| 10 | 2-hydroxy-4'-diisopropylaminocarbonyl-5-tert. butylazobenzene. | Do. |
| 11 | 2-hydroxy-4'-(N-methyl-N-β-diethylaminoethyl-aminocarbonyl-5-methylazobenzene. | Do. |
| 12 | 2-hydroxy-4'-(4''-methylpiperazinylcarbonyl)-5-methylazobenzene. | Do. |
| 13 | 2-(4'-dimethylaminocarbonylphenylazo)-4-methyl-1-naphthol. | Red. |
| 14 | 2-(4'-diethylaminocarbonylphenylazo)-4-methyl-1-naphthol. | Do. |
| 15 | 2-(3'-dimethylaminocarbonylphenylazo)-4-methyl-1-naphthol. | Do. |
| 16 | 2-(4'-diethylaminocarbonylphenylazo)-4-n-butyl-1-naphthol. | Do. |
| 17 | 4-diethylamino-4'-diethylaminocarbonyl-2-methylazobenzene. | Orange. |
| 18 | 4-diethylamino-4'-dimethylaminocarbonyl-2-methylazobenzene. | Do. |

| Example | Dyestuff | Shade on polypropylene |
|---|---|---|
| 19 | 1-(4'-diethylaminocarbonylphenylazo)-2-naphthol. | Orange. |
| 20 | 4-(N-ethyl-N-β-ethoxycarbonylethylamino)-4'-dimethylaminocarbonyl azobenzene. | Do. |
| 21 | 4-[N:N-bis-(β-methoxyethyl)amino]-4'-dimethylaminocarbonylazobenzene. | Do. |
| 22 | 2-hydroxy-4'-diethylaminocarbonyl-5-methoxyazo-benzene. | Golden-yellow. |
| 23 | 4-dimethylamino-2-hydroxy-4'-diethylaminocarbonyl-5-methylazobenzene. | Orange. |
| 24 | 2-nitro-4'-diethylamino-4-diethylaminocarbonyl-2'-methylazobenzene. | Red. |
| 25 | 2-nitro-4'-diethylamino-4-di-n-butylaminocarbonyl-2'-methylazobenzene. | Do. |
| 26 | 2-chloro-4'-diethylamino-4-dimethylaminocarbonyl-2'-methylazobenzene. | Orange. |
| 27 | 2-chloro-2'-hydroxy-5-dimethylaminocarbonyl-5'-tert.butylazobenzene. | Yellow. |
| 28 | 4-diethylamino-3'-dimethylaminocarbonyl-2-methylazobenzene. | Orange. |
| 29 | 2-hydroxy-4'-methoxy-4'-diethylaminocarbonyl-5-methylazobenzene. | Reddish-yellow. |
| 30 | 4-nitro-4'-diethylamino-2-dimethylaminocarbonyl-2'-methylazobenzene. | Bluish-red. |
| 31 | 4-nitro-4'-di-n-butylamino-2-dimethylaminocarbonyl-2'-methylazobenzene. | Bluish-red. |
| 32 | 2-nitro-4'-di-n-butylamino-4-diethylamino-carbonyl-2'-methylazobenzene. | Red. |
| 33 | 4-dimethylamino-2-hydroxy-2'-methyoxy-4'-diethylaminocarbonyl-5-methylazobenzene. | Orange. |
| 34 | 1-hydroxy-4'-(4''-dimethylaminocarbonylphenylazo)-3':5-dimethylazobenzene. | Reddish-yellow. |
| 35 | 2-hydroxy-4'-(4''-dimethylaminocarbonylphenylazo)-3'-methyl-5-tert.butylazobenzene. | Do. |
| 36 | 2-hydroxy-4'-(N-methylacetylamino)-5-tert.butylazobenzene. | Yellow. |
| 37 | 4-diethylamino-4'-(N-methylacetylamino)-2-methylazobenzene. | Orange. |
| 38 | 2-hydroxy-4-(N-methylacetylamino)-2':4':5-trimethylazobenzene. | Golden-yellow. |
| 39 | 4-(2':4'-dimethylphenylazo)-5-(N-methylacetylamino)-1-naphthol. | Red. |
| 40 | 4-(2':4'-dimethylphenylazo)-5[N-methyl-ω-(di-n-propylaminoacetyl)amino]-1-naphthol. | Do. |
| 41 | 4-nitro-4'-di-n-butylamino-3'-(N-methylacetylamino)-2-methylazobenzene. | Do. |
| 42 | 2-hydroxy-4'-(N-methylchloroacetylamino)-5-methylazobenzene. | Yellow. |
| 43 | 2-hydroxy-3'-(N-cyclohexylacetylamino)-5-methyl-azobenzene. | Do. |
| 44 | 2-hydroxy-4'-(N-ethyl-ω-diethylaminoacetyl-amino)-5-methylazobenzene. | Do. |
| 45 | 2-hydroxy-4'-(N-ethyl-cyclohexylacetylamino)-5-methylazobenzene. | Do. |
| 46 | 2-hydroxy-4'-dimethylaminosulphonyl-5-methylazobenzene. | Do. |
| 47 | 4-diethylamino-4'-dimethylaminosulphonyl-2-methylazobenzene. | Orange. |
| 48 | 4-diethylamino-4'-(N-methyl-N-phenylamino-sulphonyl)-2-methylazobenzene. | Do. |
| 49 | 2-hydroxy-4'-di-n-propylaminosulphonyl-5-methylazobenzene. | Yellow. |
| 50 | 4-diethylamino-4'-di-n-propylaminosulphonyl-2-methylazobenzene. | Orange. |
| 51 | 2-hydroxy-4'-(4''-methylpiperazin-1'-ylsulphonyl)-5-methylazobenzene. | Yellow. |
| 52 | 2-hydroxy-4'-(N-methyl-ethylthioacetylamino)-5-methylazobenzene. | Do. |
| 53 | 2-hydroxy-4'-[N-methyl-((2'':4''-bis(diethylamino)triazin-6''-ylamino))]-5-methylazobenzene. | Do. |
| 54 | 2-hydroxy-4'-[N-methyl-(2'':4''-dichlorotriazin-6''-ylamino]-5-methylazobenezene. | Do. |
| 55 | 2-hydroxy-4'-(N-methyl-N-phenylamino)carbonyl-5-methylazobenzene. | Do. |
| 56 | 2-hydroxy-4'-(N-benzyl-N-methylamino)carbonyl-5-methylazobenzene. | Do. |
| 57 | 1-[4'(-dimethylaminocarbonylmethylthio)-phenylazo]-2-naphthol | Orange. |
| 58 | 4-diethylamino-4'-(dimethylaminocarbonylmethylthio)-2-methylazobenzene | Do. |
| 59 | 1-[4'-(3''-dimethylaminocarbonylmethylphenylazo)-3'-methylphenylazo]-2-naphthol | Red. |
| 60 | 1-[4'-(3''-methylphenylazo)-3'-(dimethylaminocarbonylmethyl)-phenylazo]-2-naphthol | Do. |
| 61 | 4-diethylamino-3'-(dimethylaminocarbonylmethyl)-2-methylazobenzene | Orange. |
| 62 | 4-[N-ethyl-N-(β-dimethylaminocarbonyl)ethyl-amino]-2':4'-dimethylazobenzene | Do. |
| 63 | 4-nitro-4'-[N-ethyl-N-(β-dimethylaminocarbonyl)ethylamino]-2-methylazobenzene | Red. |
| 64 | 2-nitro-4-di-n-propylaminosulphonyl-4'-methyl-diphenylamine | Yellow. |
| 65 | 2-nitro-4-dimethylaminocarbonyl-4'-methyldiphenylamine | Do. |
| 66 | 2-nitro-4-diethylaminocarbonyl-4'-methyldiphenylamine | Do. |
| 67 | 4-di-n-butylamino-β-cyano-β-dimethylaminocarbonylstyrene | Do. |
| 68 | 2-hydroxy-4'-(N-methyl-methylsulphonyl-amino)-5-methylazobenzene | Do. |
| 69 | 4-diethylamino-4'-(N-methyl-methylsulphonyl-amino)-2-methylazobenzene | Orange. |
| 70 | 1-amino-4-phenylamino-2-dimethylaminosulphonylanthraquinone | Blue. |

| Example | Dyestuff | Shade on polypropylene |
|---|---|---|
| 71 | 1:4-diamino-2-di-n-butylaminocarbonylanthraquinone | Violet. |
| 72 | 1:4-bis-(3'-dimethylaminosulphonyl-4'-methyl phenylamino)anthraquinone | Blue-green. |
| 73 | 1-amino-4-(3'-dimethylaminocarbonylphenylamino)-anthraquinone | Blue. |
| 74 | 1-amino-4-(2'-di-n-butylaminocarbonylphenylamino)-2-bromoanthraquinone | Do. |
| 75 | 1-amino-4-(2'-di-n-butylaminocarbonylphenylamino)-2-chloro-anthraquinone | Do. |
| 76 | 4-hydroxy-1-amino-2-(4'-di-n-butylaminosulphonylphenoxy)anthraquinone | Red. |
| 77 | The product obtained by chlorosulphonation of copper phthalocyanine and subsequent reaction with di-n-butylamine. The product contains from 3-4-sulphon-di-n-butylamido groups. | Greenish-blue. |
| 78 | 2-hydroxy-4'-N-piperidnyilcarbonyl-5-methyl-azobenzene. | Yellow. |
| 79 | 4-diethylamino-4'-di-n-butylaminocarbonyl-2-methylazobenzene. | Orange. |
| 80 | 4-diethylamino-4'-(N-methyl-N-cyclo-hexyl-aminocarbonyl)-2-methylazobenzene. | Do. |
| 81 | 4-diethylamino-4'-(N-phenylacetylamino)-2-methylazobenzene. | Do. |
| 82 | 2-hydroxy-4'-[4''-(N-methylacetylamino)phenylazo]-3':5-dimethylazobenzene. | Reddish-yellow. |
| 83 | 2-hydroxy-4'-[N-methyl-4'':6''-dichloro-pyrimidin-2''-ylamino]-5-methylazobenzene. | Yellow. |
| 84 | 4-diethylamino-3'-N-piperidinylsulphonyl-2-methylazobenzene. | Orange. |
| 85 | 4-diethylamino-3'-(N-methyl-N-cyclohexyl-amino-sulphonyl)-2-methylazobenzene. | Do. |
| 86 | 2-hydroxy-4'-(N-methyl-2''-chloro-4''-methoxy-s-triazin-6''-ylamino)-5-methylazobenzene. | Yellow. |
| 87 | 4-diethylamino-2-(N-methylacetylamino)-2':4'-dimethylazobenzene. | Orange. |
| 88 | 1-amino-4-(4'-N-methylacetylamino)phenyl-amino anthraquinone. | Blue. |
| 89 | 4-(dimethylamino carbonyl)phenylmethylene phenylimine. | Yellow. |
| 90 | 4-(N-methyl-acetylamino)phenylmethylene-4'-dimethylaminophenylimine. | Do. |
| 91 | 4-(di-n-propylaminosulphonyl)phenylmethylene-phenylimine. | Do. |
| 92 | 2'-hydroxy-4-diethylaminocarbonyl-4'-(N-methylacetamido)-5'-methylazobenzene. | Orange. |

We claim:
1. Process for the dyeing of stereoregular polypropylene textile materials which comprises applying to said textile material an aqueous dispersion of a water-insoluble dyestuff of the formula

D—X—R wherein
D is the radical of a coloured compound selected from the class consisting of mono- and dis-azo, anthraquinone, methine, azamethine and nitrodiphenylamine compounds, any substituents in said compounds being selected from the class consisting of alkyl and alkoxyl radicals of 1 to 4 carbons atoms, hydroxyl and amino radicals, alkyl- and dialkylamino radicals having 1–4 carbon atoms in the alkyl groups, N-ethyl-N-β-carbethoxyethyl-amino and N:N-bis(β-carbethoxyethyl)amino radicals, anilino radicals and chlorine and bromine atoms,
X is joined to a cyclic or non-cyclic carbon atom of D and represents a member of the class consisting of radicals of the formula

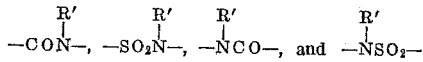

R' represents a radical selected from the class consisting of lower alkyl, chloro-, diethylamino-, dipropylamino- and ethylthio- lower alkyl, cyclohexylmethyl, cyclohexyl and benzyl, radicals,
and R' represents a radical selected from the class consisting of lower alkyl, chloro-, diethylamino, dipropylamino- and ethylthio- lower alkyl, cyclohexylmethyl, cyclohexyl and benzyl and phenyl radicals.
2. A process for the dyeing of stereoregular polypropylene textile materials which comprises applying to said textile material a dye liquor consisting of an aqueous dispersion of a water-insoluble dyestuff containing at least one fully substituted amide group.

References Cited by the Examiner
UNITED STATES PATENTS

| | | | |
|---|---|---|---|
| 1,995,933 | 3/35 | Laska et al. | 260—204 X |
| 2,112,403 | 3/38 | Krzikalla et al. | 260—204 |
| 2,633,461 | 3/53 | Seidenfaden et al. | 260—207 X |

FOREIGN PATENTS

| | | |
|---|---|---|
| 809,495 | 2/59 | Great Britain. |
| 814,582 | 6/59 | Great Britain. |

NORMAN G. TORCHIN, *Primary Examiner.*